United States Patent [19]

Woods et al.

[11] 4,387,412

[45] Jun. 7, 1983

[54] COMBINATION STARTER-PROTECTOR DEVICE

[75] Inventors: Lee O. Woods, Morrison; Donald L. Haag, Sterling, both of Ill.

[73] Assignee: General Electric Company, Fort Wayne, Ind.

[21] Appl. No.: 202,873

[22] Filed: Oct. 31, 1980

[51] Int. Cl.³ ............ H02H 7/08

[52] U.S. Cl. ............ 361/27; 361/29; 361/26; 318/783

[58] Field of Search ............ 361/29, 28, 27, 26, 361/25, 24, 31, 32, 106; 318/783, 784, 785; 310/68 R, 68 B, 68 C; 338/57, 220

[56] References Cited

U.S. PATENT DOCUMENTS

| | | | |
|---|---|---|---|
| 3,988,709 | 10/1976 | McKinnon et al. | 361/24 |
| 4,037,316 | 7/1977 | Stoll | 361/27 X |
| 4,084,202 | 4/1978 | Stoll | 361/24 |
| 4,092,573 | 5/1978 | D'Entremont . | |
| 4,164,000 | 8/1979 | Woods | 361/27 |
| 4,237,508 | 12/1980 | Woods et al. | 361/24 |
| 4,237,510 | 12/1980 | Thompson, Jr. et al. | 361/29 X |

FOREIGN PATENT DOCUMENTS 1042126 9/1966 United Kingdom .

*Primary Examiner*—Patrick R. Salce
*Attorney, Agent, or Firm*—Joseph E. Papin

[57] ABSTRACT

A method of assembling a combination starter-protector device and mounting it in a preselected assembly position onto at least a pair of plug terminals associated with a housing having a dynamoelectric machine arranged therein and with the at least plug terminal pair connected in circuit relation with a winding circuit of the dynamoelectric machine. The combination starter-protector device includes a pair of separable casing members, a PTCR, an overload protector, and at least a pair of female terminals. In this method, the PTCR, the protector device and the at least female terminal pair are enclosed within the casing members, and a resilient means is releasably secured generally about a major peripheral portion of the casing members for retaining them against separation. The at least plug terminal pair are in electrical contacting engagement respectively within the at least female terminal pair so as to mount the combination starter-protector device in its preselected assembly position, and a part of the resilient means is releasably attached with a part of the housing at least generally adjacent the at least plug means pair associated therewith so as to releasably maintain the combination starter-protector device against displacement from its preselected assembly position.

A combination starter-protector device and a method of assembling such are also disclosed.

11 Claims, 11 Drawing Figures

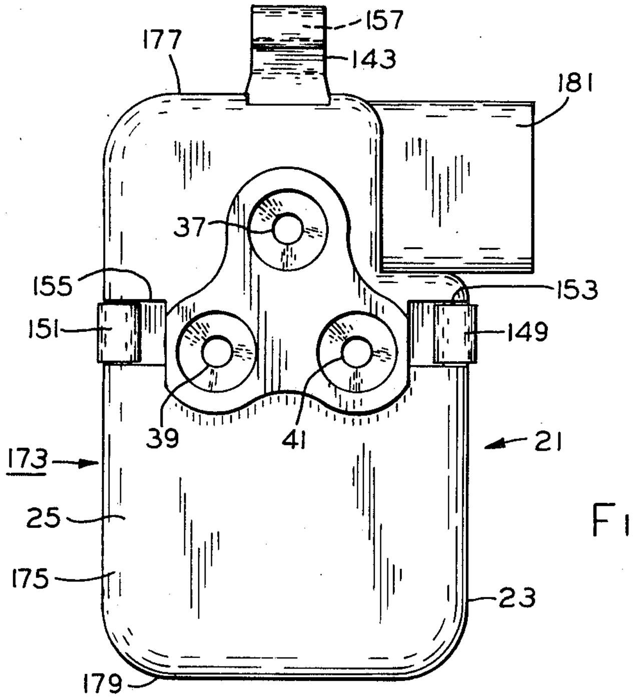
FIG. 2
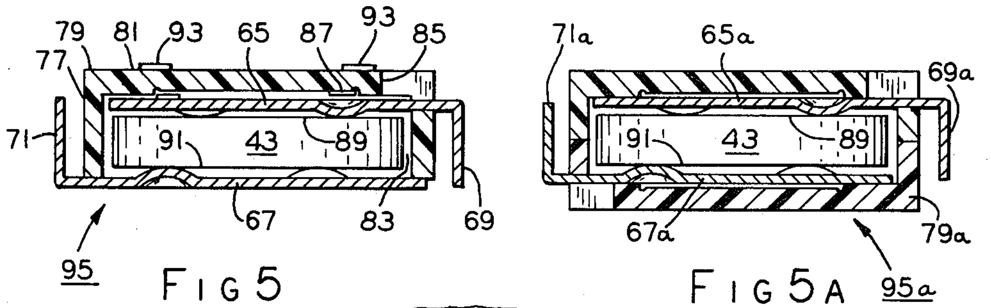
FIG 5
FIG 5A
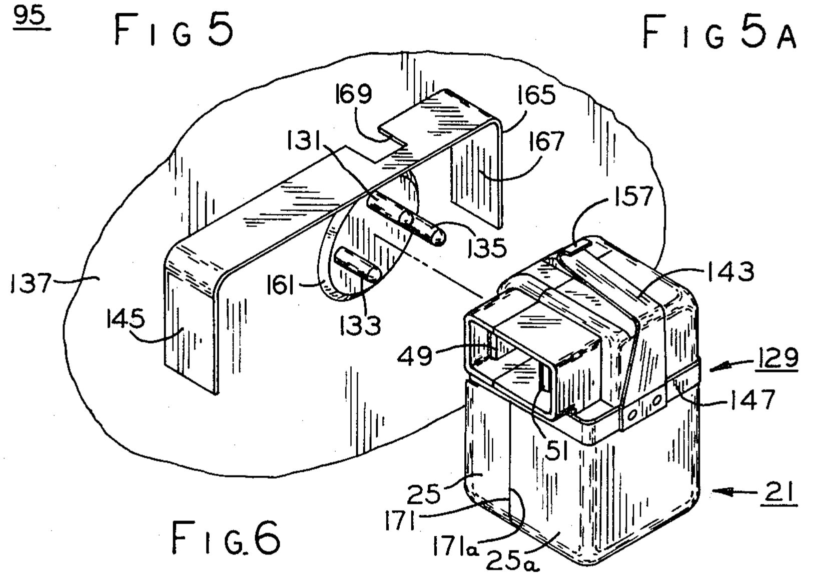
FIG. 6

COMBINATION STARTER-PROTECTOR DEVICE

FIELD OF THE INVENTION

This invention relates in general to electrical devices and in particular to a combination starter-protector device.

BACKGROUND OF THE INVENTION

In the past, various different types of combination starter-protector devices have been utilized in circuit relation with a winding circuit of a dynamoelectric machine. At least some of these past combination starter-protector devices utilized a positive temperature coefficient resistor (hereinafter referred to as a PTCR) which was operable generally to impede or otherwise at least throttle current flow therethrough to a start or auxiliary winding means of a dynamoelectric machine winding circuit generally as the dynamoelectric machine was energized to its preselected running speed, and an overload protector was thermally coupled with the PTCR and subjected to the current in at least a run or main winding means of the dynamoelectric machine winding circuit during the energization of the dynamoelectric machine. Of course, the overload protector was operable to interrupt current flow to the dynamoelectric machine winding circuit in the event of the occurrence of a winding circuit overload condition which may have a deleterious effect on components of the dynamoelectric machine, such as for instance, burning-out of the winding circuit. U.S. Pat. No. 4,037,316 issued July 26, 1977 to Donald H. Stoll, U.S. Pat. No. 4,042,860 issued Aug. 16, 1977 to Lee O. Woods and James P. Frank, U.S. Pat. No. 4,084,202 issued Apr. 11, 1978 to Donald H. Stoll, and U.S. Pat. No. 4,131,871 issued Dec. 26, 1978 to Donald L. Haag and Lee O. Woods illustrate some of the above discussed combination starter-protector devices, as well as the operation thereof in circuit with a dynamoelectric machine winding circuit, and each of these aforementioned patents is incorporated herein by reference.

The past combination starter-protector devices were associated in various manners with various types of dynamoelectric machines utilized for instance in various air conditioning and refrigeration apparatus or the like, and if a more complete discussion of the prior art association of such combination starter-protector devices with such apparatus is desired, reference may be had to the commonly assigned copending Lee O. Woods and Donald L. Haag application Ser. No. 143,029 filed Apr. 23, 1980 (now U.S. Pat. No. 4,319,299 issued Mar. 9, 1982) which is also incorporated herein by reference.

It is believed that when a PTCR is for some reason defectively manufactured, such defective PTCR mounted within a combination starter-protector device may fail, such as for instance by generally complete disintegration which is apt to be accompanied by heat of rather high intensity. Further, it is believed that this intense heat may melt or flame a housing of the combination starter-protector device in which the PTCR is mounted and might spread into the air conditioning or refrigeration equipment utilizing such combination starter-protector device so as to cause fire damage to such apparatus as well as at least the space or room in which such apparatus may be located. Thus, it is believed to be advantageous to encase the PTCR in a fire retardant material within the combination starter-protector device.

SUMMARY OF THE INVENTION

Among the several objects of the present invention may be noted the provision of an improved combination starter-protector device which overcomes at least some of the disadvantageous or undesirable features discussed above, as well as others, with respect to the prior art; the provision of such improved combination starter-protector device wherein a PTCR within a chamber of such combination starter-protector device is isolated therefrom within an encasement of flame retardant material; the provision of such improved combination starter-protector device in which encasement for the PTCR is supported within the chamber of the combination starter-protector device by a pair of female terminals mounted in the casing or housing of the combination starter-protector device defining such chamber; the provision of such improved combination starter-protector device in which resilient means are utilized for retaining a pair of separable casing or housing members of such combination starter-protector device against separation with the resilient means including means adapted for releasable attachment to a part of an apparatus when such combination starter-protector device is removably mounted in a preselected position on such apparatus; and the provision of such combination starter-protector device having components utilized therein which are simplistic in design, economically manufactured and easily assembled. These as well as other objects and advantageous features of the present invention will be in part apparent and in part pointed out hereinafter.

In general and in one form of the invention, a combination starter-protector device has a housing with a chamber therein, a PTCR in the chamber, and a bimetal switch means in the chamber and adapted for thermal coupling with the PTCR. An opening in the housing intersects with the chamber, and a pair of male terminals arranged in preselected positions in the opening each including an electrical connector section accessible from exteriorly of the housing and a support section within the chamber. Means is secured to the housing within the chamber for mounting the support section of one of the male terminals and for displacement preventing engagement with the support section of the other of the terminals so as to maintain the male terminals generally in the preselected positions thereof.

Further in general, a combination starter-protector device in one form of the invention has a housing with a chamber therein. A starter device in the chamber includes a PTCR, a pair of means for electrical contacting engagement with the PTCR, respectively, means for encasing therewithin the PTCR and at least one of the electrical contacting engagement means so as to generally physically isolate the PTCR from the chamber, and a pair of tabs respectively extending from the electrical contacting engagement means exteriorly of the encasing means. A pair of apertures in the housing intersect with the chamber, and a pair of female terminal means in the apertures are fixedly connected with the tabs and adapted for positioning the starter device within the chamber, respectively. A bimetal switch means is arranged in the chamber and adapted for thermal coupling with the PTCR.

Still further in general, a combination starter-protector device in one form of the invention has a housing with a chamber therein. A PTCR in the chamber is adapted to emit heat upon energization, and a bimetal switch means is arranged in the chamber in thermal coupling relation with the PTCR. Means within the chamber is formed of flame retardant material for encasing the PTCR so as to generally physically isolate it in the event of the occurrence of extreme heat eminated from the PTCR in response to a decomposition thereof when energized.

Yet in general and in one form of the invention, a combination starter-protector device is adapted for removable mounting in an assembly position onto at least a pair of plug terminals associated with a housing having a dynamoelectric machine arranged therein and with the at least male terminal pair connected in circuit relation with a winding circuit of the dynamoelectric machine. The combination starter-protector device comprises a casing including a pair of separable casing members and a chamber within the casing members. A PTCR and a bimetal switch means are disposed in the chamber and arranged in thermal coupling relation. A pair of female terminal means in the casing are connected in circuit relation with the PTCR and the bimetal switch means and are adapted for receiving in electrical engagement the at least plug terminal pair, respectively, when the combination starter-protector device is removably mounted in the assembly position thereof. Resilient means is releasably secured with the casing members for retaining them against separation and include means for releasable securing engagement with a part of the housing generally adjacent the plug terminal part so as to releasably maintain the combination starter-protector device against displacement from its assembly position.

BRIEF DESCRIPTION OF THE DRAWINGS

FIG. 2 is a front elevational view of the combination starter-protector device of FIG. 1;

FIG. 5 is a sectional view of a starter device in FIG. 1 taken along line 5—5 thereof;

FIG. 5A is a sectional view of an alternative starter device for use in the combination starter-protector device of FIG. 1 in one form of the invention;

FIG. 6 is an exploded partial perpsective view illustrating at least in part principles which may be practiced in a method of assembling a combination starter-protector device and mounting to an apparatus or the like;

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the disclosure or the scope of the claims which follow.

DETAILED DESCRIPTION OF THE PREFERRED EMBODIMENTS

Figure 1:
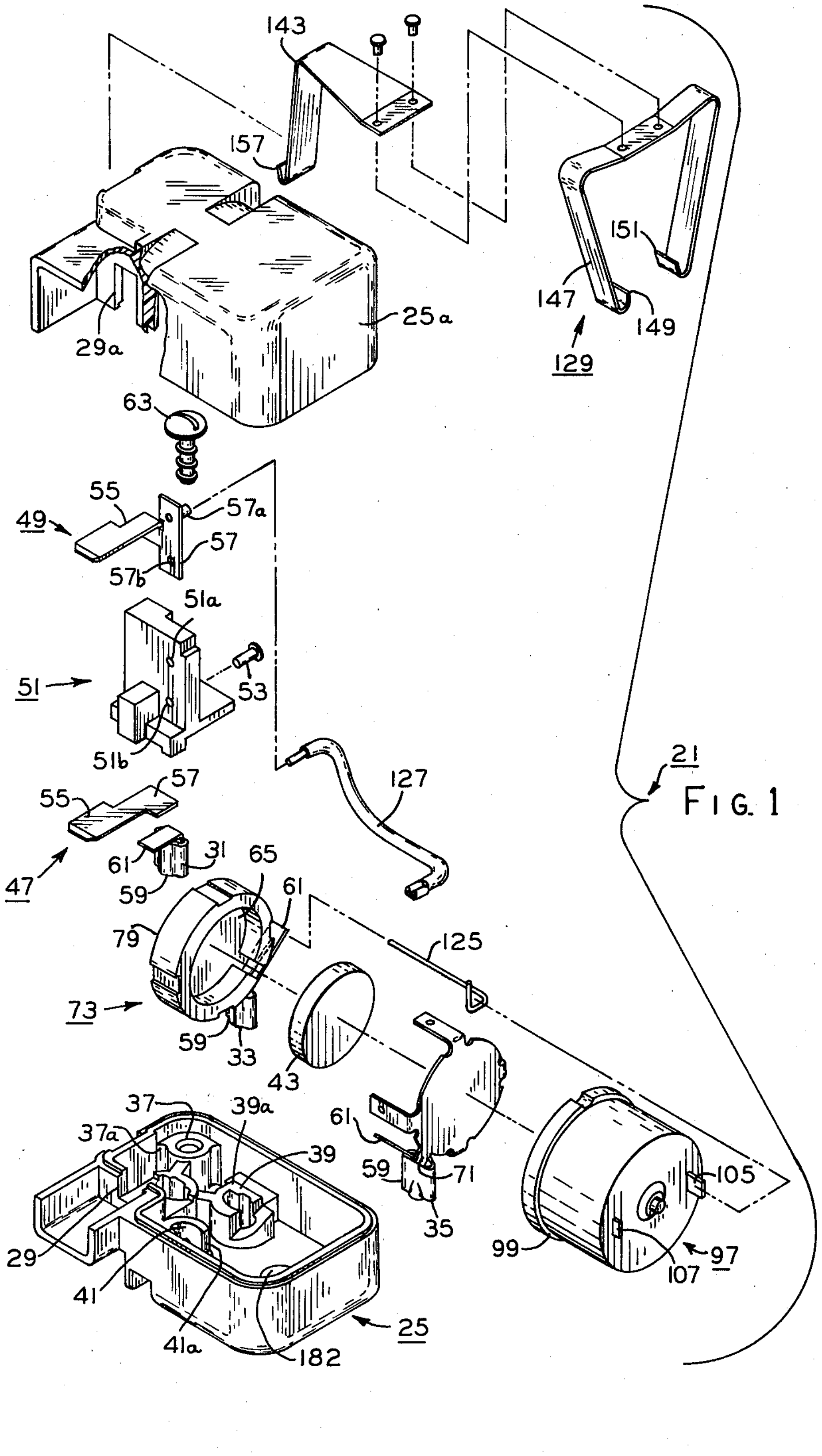
FIG. 1 is an exploded perspective view showing a combination starter-protector device in one form of the invention and illustrating principles which may be practiced in a method of assembling the combination starter-protector device.
Figure 3:
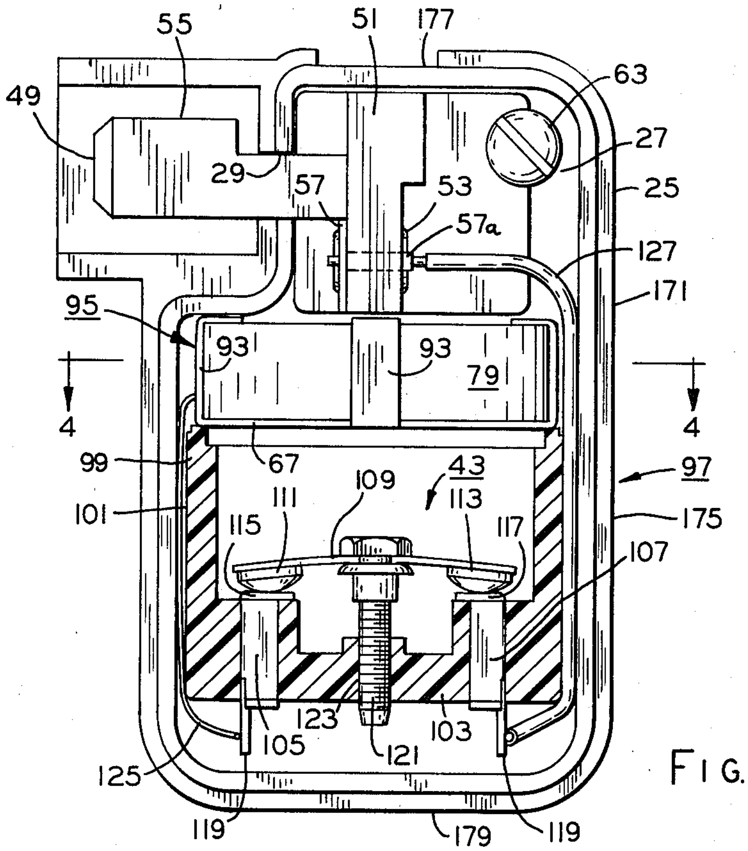
FIG. 3 is a partial view of the combination starter-protector device of FIG. 2 with a casing member thereof removed for clarity.
Figure 4:
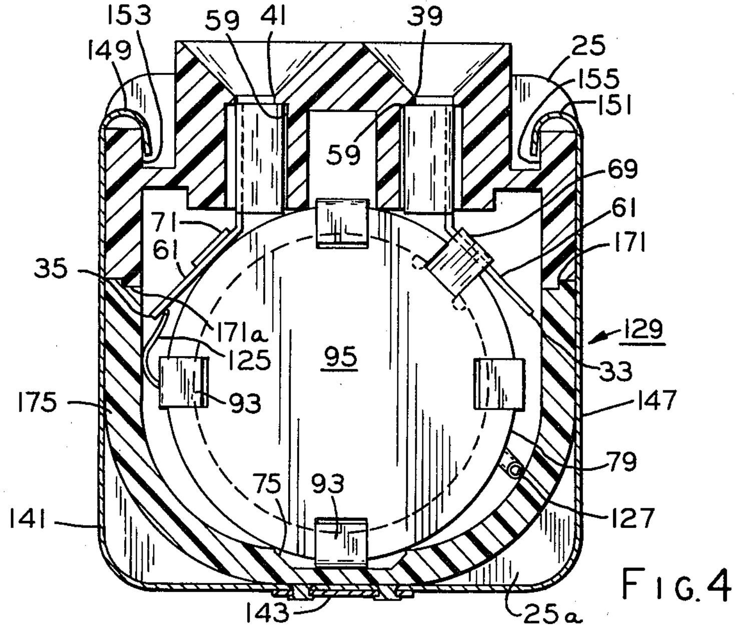
FIG. 4 is a sectional view taken along line 4—4 of FIG. 3.

Referring now to the drawings in general, there is illustrated a method of assembling a combination starter-protector device 21 including a casing or housing 23 having a pair of casing or housing members 25, **25*a* which, when fitted or otherwise assembled together, define a chamber 27 therewithin, and each of the casing members has a mating opening or opening parts 29, 29*a* therethrough (FIGS. 1-5). Combination starter-protector device 21 further includes a plurality of female terminals or female terminal means 31, 33, 35, a plurality of apertures or openings 37, 39, 41 therefor in casing member 25, a PTCR 43, a bimetal switch means 45 adapted for thermal coupling relation with the PTCR, a pair of male terminals or male terminal means 47, 49, and a terminal mounting piece 51 (FIGS. 1, 3 and 4). In this method, male terminal 47 is interconnected by suitable means, such as soldering, welding, crimping or the like for instance, with female terminal 31, and male terminal 49 is mounted or otherwise positioned by suitable means, such as at least one rivet 53 or the like for instance, to terminal mounting piece 51 (FIG. 1). Female terminal 31 is located, positioned or otherwise inserted into aperture 37 in casing member 25, and male terminal 47 is placed or otherwise positioned so as to in part extend through opening part 29 in casing member 25 (FIGS. 3 and 4). Male terminal 47 is captured or otherwise abutted in engagement between casing member 25 and terminal mounting piece 51 so as to position or otherwise arrange male terminal 49 generally in spaced apart side-by-side relation with male terminal 47 upon the movement of opening part 29*a* in casing member 25*a* over terminal 47 into mating relation with opening part 25 in casing member 25 when the casing members are assembled or otherwise fitted together so as to generally enclose chamber 27 therewithin (FIGS. 1, 3 and 4**).

More particularly and with specific reference to FIGS. 1 and 3, each of male terminals 47, 49 have an electrical connector section 55 which is disposed so as to be accessible from exteriorly of casing 23, and a support or supporting section 57 is provided on each male terminal interiorly of the casing within chamber 27 with supporting section 57 of male terminal 49 having a hollow extension or ferrule **57*a* integrally formed therefrom along with an aperture 57*b* extending therethrough. Each female terminal 31, 33, 35 is provided with a split sleeve or electrical connector section 59 adapted to be received in casing member apertures 37, 39, 41, respectively, so as to be accessible from exteriorly of casing 23, and a support or supporting section 61** is provided on each female terminal which is adapted to be disposed within chamber 27, as discussed in greater detail hereinafter.

The interconnection of female and male terminals 31, 47 comprises both electrically and mechanically connecting the respective supporting sections 57, 61 thereof by suitable means, as previously mentioned, and when so interconnected, split sleeve 55 of female terminal 31 is placed or otherwise seated within aperture 37 of casing member 25 while male terminal 47 is disposed in opening part 29 of the casing member so that its electrical connector section 55 of the male terminal extends generally exteriorly of the casing member. Thereafter, terminal mounting piece 51 with male terminal 49 mounted thereon is moved to a position located in casing member 25 generally in overlaying relation with interconnected supporting sections 57, 61 of female and male terminals 31, 47 so as to capture or abut such interconnected supporting sections between the casing member and the terminal mounting piece, and the terminal mounting piece is fixedly secured or otherwise attached or mounted by suitable means, such as for instance a screw 63 or the like, to the casing member. When so secured to casing member 25, it may be noted that the terminal mounting piece 51 is arranged so as to extend generally across opening part 29 in casing member 25 thereby to generally close the opening part, and it may also be noted that male terminal 49 mounted to the terminal mounting piece is disposed or otherwise positioned in spaced apart generally side-by-side relation with male terminal 47. It may also be noted that a part of terminal mounting piece 51 is disposed in overlaying or abutting relation with at least supporting section 57 of female terminal 31 thereby to at least in part maintain split sleeve section 59 of the female terminal against displacement from aperture 37 of casing member 25. Thus, securing terminal mounting piece 51 in engagement with casing member 25 within the part of chamber 27 defined thereby serves to retain or otherwise maintain female terminal 31 within casing member aperture 37 against displacement therefrom. To mount male terminal 49 with terminal mounting piece 51, ferrule 51*a* on supporting section 57 of the male terminal is inserted into aperture 51*a* of the terminal mounting piece, and apertures 51*b*, 57*b* of the terminal mounting piece and the male terminal are registered or aligned with each other to receive rivet or eyelet 53 thereby to secure the supporting section of the male terminal to the terminal mounting piece. Of course, the securement of male terminal 49 to terminal mounting piece 51 may occur prior to the attachment of the terminal mounting piece in its assembly position to casing member 25, as discussed above.

With female terminal 31 and male terminals 47, 49 so positioned with respect to casing member 25, PTCR 43 and bimetal switch means 45 may be disposed in their thermal coupling relation within the part of chamber 27 defined by casing member 25, as discussed in greater detail hereinafter, and casing member 25*a* may be moved or otherwise assembled or fitted together with casing member 25 so as to generally enclose chamber 27 therewithin. Upon this assembling of casing members 25, 25*a*, it may be noted that opening part 29*a* in casing member 25*a* *is moved or otherwise passed over male terminal 49 mounted to terminal mounting piece 51 thereby to mate together opening parts 29, 29a* of the casing members so that electrical connector sections 59 of male terminals 47, 49 extend generally exteriorly of casing 23, and it may also be noted that opening part 29*a* in casing member 25*a* is arranged or otherwise positioned at least closely adjacent the terminal mounting piece so as to be generally closed thereby.

With reference again to the drawings in general and recapitulating at least in part with respect to the foregoing, there is also illustrated a method of assembling combination starter-protector device 21 including casing members 25, 25*a* adapted to define chamber 27 therewithin, at least aperture pair 39, 41 through casing member 25, PTCR 43, a pair of contact plates 65, 67 having a pair of tabs 69, 71 respectively extending therefrom, at least female terminal pair 33, 35, and bimetal switch means 45 (FIG. 1). In this method, PTCR 43 is embraced or otherwise arranged in contacting engagement between contact plates 65, 67, and the PTCR and at least one of the contact plates are disposed within a means 73 for encasing at least the PTCR and the at least one contact plate with tabs 69, 71 of the contact plates being arranged exteriorly of encasing means 73 (FIGS. 5 and 5A). After tabs 69, 71 are interconnected with female terminals 33, 35 by suitable means, such as soldering, welding, crimping or the like for instance, the female terminals are inserted or otherwise placed into apertures 39, 41 therefor in casing member 25 thereby to support encasing means 73 with respect to the casing member, and bimetal switch means 45 is arranged or otherwise positioned in the casing member in the thermal coupling relation with PTCR 43 (FIGS. 3 and 4). Casing members 25, 25*a* are thereafter assembled together so as to enclose encasing means 73 within chamber 27, and a part, such as at least one abutment 75 on casing member 25*a* within the chamber for instance, is associated or otherwise located or arranged at least adjacent a part, such as a sidewall 77 or the like for instance, of the encasing means so as to retain female terminals 33, 35 against displacement from apertures 39, 41 in casing member 25 (FIGS. 1 and 4).

More particularly and with specific reference to FIGS. 1, 3-5, and 5A, encasing means 73 is provided with a casing or housing 79 having a base wall 81 integrally formed with sidewall 77 so as to define therein an open-ended recess or recess means 83, and a tab receiving slot or opening 85 extends through at least one of the sidewall and the base wall so as to intersect with the recess. Tab 69 of contact plate 65 is inserted through slot 85 so as to extend exteriorly of casing 79, and the contact plate is positioned at least adjacent base wall 81; however, if desired, resilient means, such as a wavy washer 87 or the like for instance, may be interposed between the contact plate and the base wall for exerting a biasing force on the contact plate, as discussed hereinafter. PTCR 43 is then placed or otherwise disposed in casing recess 83 with one opposite contact side 89 thereof in electrical contacting and mechanical supporting engagement with contact plate 65, and the other opposite contact side 91 of the PTCR is disposed at least adjacent the open end of the casing recess. Contact plate 67 is then arranged on casing 79 so as to extend generally across recess 83 thereby to generally enclose it with PTCR 43 isolated therein, and the contact plate is also arranged in both electrical contacting and mechanical supporting engagement with opposite contact side 91 of the PTCR. With PTCR 43 so enclosed or otherwise isolated within recess 83, tab 71 of contact plate 67 extends or is otherwise exposed exteriorly of casing 79, and a plurality of locking tabs or fingers 93 integrally formed on the contact plate are deformed or otherwise extended over the external periphery of casing sidewall 77 into gripping or displacement preventing engagement with casing base wall 81 thereby to releasably secure the contact plate against displacement from casing 79. When so assembled together, it may be noted that casing 79 and contact plate 67 comprise encasing means 73 and that the casing, contact plates 65, 67 and PTCR 43 define a solid state starter device 95; and if a more detailed discussion of such starter device, its component parts, and the construction or assembly thereof is desired, reference may be had to U.S. Pat. No. 4,164,000 issued to Lee O. Woods on Aug. 7, 1979, which patent is specifically incorporated herein by reference.

With starter device 95 so assembled together, as discussed above, tabs 69, 77 of contact plates 65, 67 may be respectively interconnected or otherwise attached with supporting sections 61 of female terminals 33, 35 by suitable means, such as soldering, welding, crimping or the like for instance; however, if desired, it is contemplated that the supporting section of female terminal 35 may be interconnected with tab 71 of contact plate 67 prior to its assembly with casing 79. When supporting sections 61 of female terminals 33, 35 are thus interconnected with tabs 69, 71 of contact plates 65, 67, at least one of the supporting sections and its attached tab may be bent or otherwise deformed, if necessary, so as to properly position or otherwise space split sleeves 59 the female terminals for entry into apertures 39, 41 in casing member 25. Thereafter, split sleeves 59 of female terminals 33, 35 are placed or otherwise inserted into apertures 39, 41 in casing member 25 so as to be accessible from exteriorly thereof, and it may be noted that starter device 95 is suspended or otherwise supported only on the seated female terminals in the part of chamber 27 defined by casing member 25 so as to arrange PTCR 43 within the starter device in the thermal coupling relation with bimetal switch means 45. Casing members 25, 25*a* may then be assembled together in the same manneer previously discussed so as to enclose starter device 95 and encasing means 73 thereof within chamber 27, and upon such assembling together of the casing members, abutment 75 on casing member 25*a* is disposed at least adjacent sidewall 77 of encasing means 73 thereby to retain split sleeve sections 59 of female terminals 33, 35 generally against displacement from their respective seated positions within apertures 39, 41 in casing member 25. If a more detailed discussion of the construction of female terminals 33, 35 is desired, reference may be had to U.S. Pat. No. 4,131,871 issued to Donald L. Haag and Lee O. Woods on Dec. 26, 1978 and which patent is specifically incorporated herein by reference. However, it is contemplated that other female terminals having various other constructions and configurations may be utilized within the scope of the invention so as to meet at least some of the claims thereof.

As best seen in FIG. 3, an overload protector device or 97 is provided with a generally cylindric housing or casing 99 molded or otherwise formed of a suitable dielectric material, such as a resin or the like for instance, and has a generally annular or cylindric sidewall 101. A base or closure wall 103 is integrally formed with sidewall 101 at the lower end thereof, and the sidewall and base wall define an open-ended chamber 105 within housing 99 in which bimetal switch means 45 is located. A pair of male or spade terminals 105, 107 extend through base wall 103 of housing 99 being integrally molded therewith or otherwise retained in the base wall by suitable means, and bimetal switch means 43 includes a bimetal element 109 having a pair of contacts 111, 113 thereon adapted for making and breaking with another pair of stationary contacts 115, 117 provided on the interior end portions of terminals 105, 107, respectively. Contacts 115, 117 are arranged within housing 99 generally adjacent base wall 103 while the ends or end portions of the terminals exteriorly of the housing define electrical connector sections 119 thereof, respectively. As shown, when bimetal element 109 is in an at-rest or circuit completing position thereof, contacts 111, 113 of the bimetal switch element are disposed in circuit making engagement with contacts 115, 117 of terminals 105, 107. Bimetal switch element 109 is generally centrally mounted to or carried on an adjusting screw 121 which is adjustably or threadedly received in a threaded aperture or opening 123 in base wall 103 of housing 99 to adjust the bias on bimetal switch element 109 urging its movable contacts 111, 113 into making engagement with stationary contacts 115, 117 of terminals 105, 107, respectively. While protector device 97 is presented herein for purposes of disclosure, it is contemplated that other types of protector devices having various other configurations and/or component parts may be utilized within the scope of the present invention so as to meet the objects and advantageous features thereof. Protector device 97 is a model 3ARG1 overload available from the General Electric Company, Morrison, Ill.

Prior to the above discussed insertion of female terminals 33, 35 into seating engagement in apertures 39, 41 of casing member 25 so as to assembly starter device 95 therewith, a lead 125 is interconnected by suitable means, such as soldering, welding, crimping or the like for instance, between supporting section 61 of female terminal 35 and electrical connector section 119 of protector device terminal 105, and one end of another lead 127 is also connected by such same suitable means with electrical connector section 119 of protector device terminal 107. Thus, it may be noted that starter device 95 and protector device 97 are interconnected or otherwise assembled together or suspended with respect to each other by lead 125. Therefore, protector device 97 may be placed, located or otherwise assembled into the part of chamber 27 defined by housing member 25 either prior to, simultaneously with or subsequent to the aforementioned placement of starting device in such chamber part of the casing member. With starter device 95 and protector device 97 so arranged in casing member 25, it may be noted that PTCR 43 and bimetal switch means 45 are disposed in thermal coupling relation. Of course, upon the arrangement of starter device 95 and protector device 97 within casing member 25, leads 123, 125 may be arranged or otherwise disposed so as to extend generally between sidewall 101 of protector device housing 99 exteriorly thereof and casing member 25 generally within the part of chamber 27 defined thereby, and the other or free end of lead 127 may be inserted into ferrel 57*a* on supporting section 57 of male terminal 49 and connected therewith by suitable means, such as soldering, welding, crimping or the like for instance. Subsequent to the placement of the above discussed components of combination starter-protector device 21 with respect to casing member 25 thereof, casing member 25*a* may be assembled together with casing member 25, as previously discussed, so as to generally enclose such components within chamber 27 of the casing members.

While it is preferred to assemble the components of combination starter-protector device 21, a discussed above, it is contemplated that such components may be assembled in various different sequences and also in different manners within the scope of the invention so as to meet at least some of the objects thereof. For instance, prior to the placement of terminal mounting piece 51, starter device 95 and protector device 97 in casing member 25, leads 125, 127 may be interconnected generally in the same manner as discussed above so that the terminal mounting piece, the starter device and the protector device are all interconnected or otherwise assembled or suspended with respect to each other by such leads. When so interconnected, terminal piece 51, starter device 95 and protector device 97 may then be placed in their respective assembly positions in casing member 25, and the terminal mounting piece may be interlocked in its assembly position by screw 63, as previously discussed.

Upon the assembly of casing members 25, 25*a* together so as to enclose chamber 27 therein, as previously discussed, resilient means, such as a spring or spring assembly 129 or the like for instance, may be associated with casing 23 for retaining or otherwise maintaining casing members 25, 25*a* against displacement from their assembled position with respect to each other, as discussed in greater detail hereinafter.

It has been found that, upon energization, a PTCR may fail in several different modes or conditions. For instance, in one such failure mode, it is believed that the PTCR may generate heat having an intensity great enough to perhaps ignite and/or melt adjacent components associated therewith of a starter device or a combination starter-protector device as well as perhaps other apparatus or parts thereof to which such starter device or combination starter-protector device may be mounted or otherwise associated. Thus, it may be noted that casing 79 of starter device 95 is preferably formed of a material, such as a resin or the like for instance, which may be identified in the Underwriters Laboratory code as being a flame retardant material, and contact plate 67 of the starter device is formed of a metal having a melting point sufficiently great enough to resist melting in the presence of the aforementioned intense heat generated by the PTCR in the event of the occurrence of the failure mode thereof effecting such intense heat. Since encasing means 73 of starter device 95 comprises casing 79 and contact plate 67, each formed of materials which will resist the intense heat producing failure mode of the PTCR and since the PTCR is physically enclosed and isolated within such encasing means, it may also be noted that the other components of combination starter-protector device 21 are protected against such intense heat in the event of the occurrence of the failure mode of the PCTR producing such intense heat.

It has also been found that during another of the aforementioned failure modes of a PTCR, it may break apart or crumble into a multiplicity of small pieces. Therefore, since PTCR 43 is physically enclosed or isolated within encasing means 73 of starter device 95, such small crumbled pieces which may be formed in the event of the occurrence of this failure mode of PTCR 43 are positively contained against displacement from recess 83 of the encasing means. Of course, this positive containment obviates the possibility of the aforementioned small crumbled pieces of the PTCR being displaced into protector device 97 of combination starter-protector device 21 so as to interfere with, or perhaps obviate, the switching operation of bimetal switch means 45 in the protector device. While the material from which casing 79 of starter device 95 is formed has been discussed hereinabove in the terms of the flame retardant properties or characteristics thereof, it is contemplated that such material should also have good impact resistance properties or characteristics.

An alternative starter device 95*a* is illustrated in FIG. 5A having generally the same component parts and functioning in the same manner in combination starter-protector device 21 as the previously described starter device 95 with the following exception. In starter device 95*a*, PTCR 43 and a pair of like contact plates 65*a*, 67*a* are encapsulated within a casing or encasing means 79*a* therefor with tabs 69*a*, 71*a* of such contact plates extending exteriorly of the casing for connection with supporting sections 61 of female terminals 33, 35, respectively. Of course, casing 79*a* is also formed of the aforementioned material having the desired high impact resistance and flame retardant properties, as previously mentioned, and it is believed that starter device 95*a* as utilized in combination starter-protector device 21 will meet at least some of the objects of the invention.

With reference again in general to the drawings and recapitulating at least in part with respect to the foregoing, there is illustrated a method of assembling combination starter-protector device 21 and mounting it in a preselected assembly position onto a plurality of plug terminals 131, 133, 135 associated with a housing or jacket 37 having a dynamoelectric machine 139 arranged therein and with at least a pair of the plug terminals connected in circuit relation with a winding circuit 141 of the dynamoelectric machine (FIGS. 6–9). Combination starter-protector device 21 includes separable casing members 25, 25*a*, PTCR 43, overload protector 97, and at least female terminals 33, 35 (FIGS. 1–5). In this method, PTCR 43, overload protector device 97 and female terminals 33, 35 are enclosed within casing members 25, 25*a*, and resilient means or spring assembly 129 is releasably secured generally about a major peripheral portion of the casing members for retaining them against separation (FIGS. 1–4). Plug terminals 131, 133 are received in electrical contacting engagement respectively within female terminals 33, 35 so as to mount the combination starter-protector device in its preselected assembly position, and a part, such as a cantilevered spring arm or leaf-type spring arm 143 or the like for instance, of spring assembly 129 is releasably attached with a part, such as a guard or fence 145 or the like for instance, of housing 137 at least generally adjacent plug terminals 131, 133, 135 associated therewith so as to releasably maintain combination starter-protector device 21 against displacement from its preselected assembly position (FIGS. 6–9).

More particularly and with specific reference to FIGS. 1, 4 and 6–8, spring assembly 129 includes a band spring or spring portion 147 which extends about the major peripheral portion or part of housing members 25, 25*a* thereby to maintain them against separation, and a pair of generally adjacent, spaced apart opposite ends or end portions 149, 151 are provided on the band spring which are arranged or otherwise releasably secured in gripping engagement with a pair of confronting parts, such as indentations, notches or ribs 153, 155 or the like for instance, provided in casing member 25. Spring arm 143 has one end thereof attached or otherwise secured by suitable means, such as welding or riveting or the like for instance, to band spring 147 the free end or end portion of the spring arm defines a detent or detent means 157.

Figure 7:
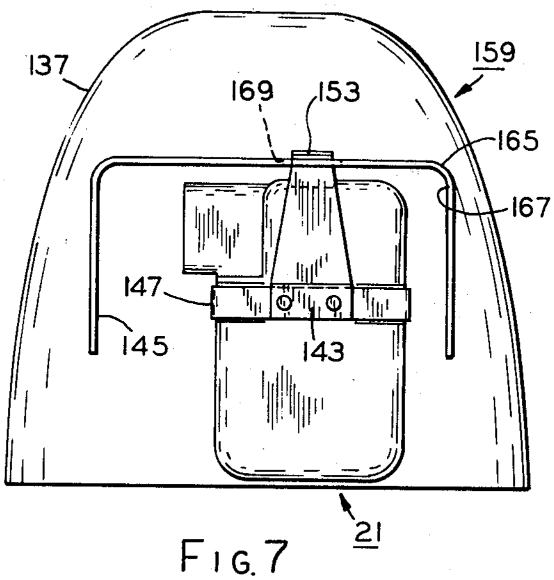
FIG. 7 is a partial elevational view of the combination starter-protector device mounted to the apparatus of FIG. 6.
Figure 8:
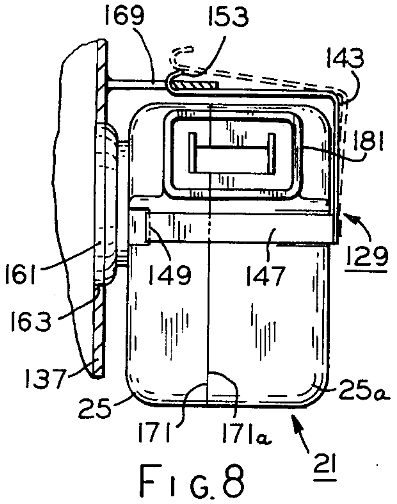
FIG. 8 is a partial sectional view taken along line 8—8 of FIG. 7.

Fence 145 comprises a metallic protective enclosure secured by suitable means, such as welding or screws or the like for instance, to housing 137 of an apparatus 159 adapted to be driven by dynamoelectric machine 139, and the fence extends at least in part generally about a dielectric plug device 161 supporting plug terminals 131, 133, 135 and fixedly received in an aperture or opening 163 provided through the apparatus housing. A free end edge or marginal portion 165 of fence 145 defines at least in part a passage means or access passage or opening 167 for the passage or movement therepast or therethrough of at least a part of combination starter-protector device 21, and means, such as another opening or notch 169 or the like for instance, is provided in the fence for releasably receiving or releasable engagement with detent 157 of spring arm 143, as discussed in greater detail hereinafter. Thus, in the assembly of combination starter-protector device 21 with apparatus 159, an assembly operator or a repair workman aligns openings 37, 39, 41 in casing 25 having split sleeves 59 of female terminals 31, 33, 35 therein with plug terminals 131, 133, 135 of plug 161, as best seen in FIGS. 2 and 6, and thereafter moves the combination starter-protector device at least in part past or through access opening 167 of fence 145 toward its preselected assembly position with the female terminals removably mounted in electrical contacting engagement onto the plug terminals, as best seen in FIGS. 7 and 8. As combination starter-protector device 21 is being moved toward its preselected assembly position, as discussed above, the operator may apply a force onto spring arm 143 to deflect or otherwise stress it from the at-rest position thereof toward a displaced position, as best seen in FIG. 8, so as to affect the passage or movement of the spring arm past free end edge 165 of fence 145 into access opening 167 thereof. Of course, during the operator movement of combination starter-protector device 21 toward its preselected assembly position, spring arm 143 thereof is generally aligned with notch 169 in fence 145; and, at least when the preselected assembly position of the combination starter-protector device is attained, the operator may release the applied force on the spring arm, and the compressive force of the spring arm effects the return movement from the displaced position toward the at-rest position thereof so as to releasably secure or otherwise interlock or engage detent 157 of the spring arm with notch 169 in fence 145, as best seen in FIG. 8. With combination starter-protector device 21 so removably mounted in its preselected assembly position onto plug terminals 131, 133, 135 of plug device 161 so as to extend at least in part into access opening 167 within the protective confines of fence 145 and with spring arm 143 of the combination starter-protector device so engaged with notch 169 in the fence, it is believed that the combination starter-protector device may not be easily or accidentally displaced from its preselected assembly position during the assembly of apparatus 159 and refrigeration or air conditioning equipment with which such apparatus may be associated, or by servicemen who may service or repair such apparatus or equipment in the field. To the contrary, in order to remove or displace combination starter-protector device 21 from its preselected assembly position, it is necessary to reapply a force on spring arm 143 urging it toward its displaced position so as to disengage spring arm detent 157 from notch 169 in fence 145 and, at the same time, also apply a disassembly force onto the combination starter-protector device so as to effect the disengagement or removal of split sleeves 59 of female terminals 31, 33, 35 of the combination starter-protector device from plug terminals 131, 133, 135 of plug 161 in order to displace or otherwise remove the combination starter-protector device through access opening 167 in the fence.

With reference again to the drawings in general and recapitulating at least in part with respect to the foregoing, combination starter-protector device 21 in one form of the invention is adapted for removable mounting in a preselected assembly position onto plug terminals 131, 135, 137 associated with housing 137 having dynamoelectric machine 137 arranged therein and the plug terminals connected in circuit relation with winding circuit 141 of the dynamoelectric machine (FIGS. 1 and 6–9). Casing 23 of combination starter-protector device 21 includes separable casing members **25, 25*a* having chamber 27 therein, and PTCR 43 and bimetal switch means 45 are arranged in thermal coupling relation within the chamber (FIG. 3). Female terminals pair 33, 35 in casing 23 are connected in circuit relation with PTCR 43 and bimetal switch means 45 and are adapted for receiving in electrical engagement plug terminal pair 133, 135, respectively, when combination starter-protector device 21 is removably mounted in the assembly position thereof (FIGS. 1, 4, 6 and 9). Spring assembly 129 is releasably secured with casing members 25, 25*a* for retaining them against separation, and the spring assembly includes spring arm 143 for releasable securing engagement with fence 145 of housing 137 generally adjacent plug terminals 131, 133, 135 so as to releasably maintain combination starter-protector device 21 against displacement from its preselected assembly position (FIGS. 1, 2, 4 and 6–8**).

More particularly and with specific reference to FIGS. 1–4, casing members **25, 25*a* of combination starter-protector device 21 have marginal edges 171, 171*a* in abutment with each other when the casing members are assembled together so as to generally define a plurality of wall means 173 of casing 23 which include a sidewall 175 generally interposed between a pair of opposite end walls 177, 179, respectively. Opening parts 29, 29*a* in casing members 25, 25*a* intersect with marginal edges 171, 171*a* and when the marginal edges are abutted together, as previously mentioned, the opening parts mate with each other so as to define an opening through casing sidewall 175 accommodating male terminals 47, 49. A shroud 181 or the like is integrally formed with at least casing sidewall 175 and extends generally about mating opening parts 29, 29*a* so as to protect electrical connector sections 55 of male terminals 47, 49 which extend through the mating opening parts generally exteriorly of casing 23. Clustered apertures 37, 39, 41 extend through casing sidewall 175, and with split sleeves 59 of female terminals 33, 35 seated in apertures 39, 41, starter device 95 is suspended in chamber 27 between casing end walls 177, 179 while casing 79 of the starter device is engaged by at least abutment 75 which is provided on casing sidewall 175 thereby to retain female terminals 33, 35 against displacement from apertures 39, 41, as previously mentioned. Although sidewall 101 of overload protector device 97 is, in effect, squeezed between a pair of pads 182 provided on casing members 25, 25*a* so as to position or otherwise abut the upper end of housing 99** generally against casing 79 of starter device 95, it is, of course, contemplated that the protector device housing may be spaced from the starter device casing wherein electrical connector sections 119 of spade terminals 105, 107 in the protector device may be disposed closer to end wall 179 of combination starter-protector device casing 23. A plurality of hubs 37*a*, 39*a*, 41*a* are integrally formed with casing member 25 being disposed about apertures 37, 39, 41 which extend therethrough.

Upon the disposition of casing marginal edges 171, 171*a* in abutment so as to assemble casing members 25, 25*a* together, band spring 147 of spring assembly 129 may be stressed and placed or otherwise positioned in its assembled position out sidewall 175 of the casing members with free ends 149, 151 of the band spring received in gripping engagement with notches 153, 155 of casing member 25 thereby to releasably maintain the casing members against separation from their assembled positions with respect to each other, as previously mentioned. When so disposed on casing 23, band spring 147 extends about at least a major portion of casing sidewall 175, and spring arm 143 extends generally adjacent the casing sidewall and over upper end wall 177 of the casing. While spring assembly 129 is illustrated herein for purposes of disclosure, it is contemplated that other springs or spring assemblies having various other configurations may be utilized with combination starter-protector device 21 within the scope of the invention so as to meet at least some of the objects thereof.

Figure 9:
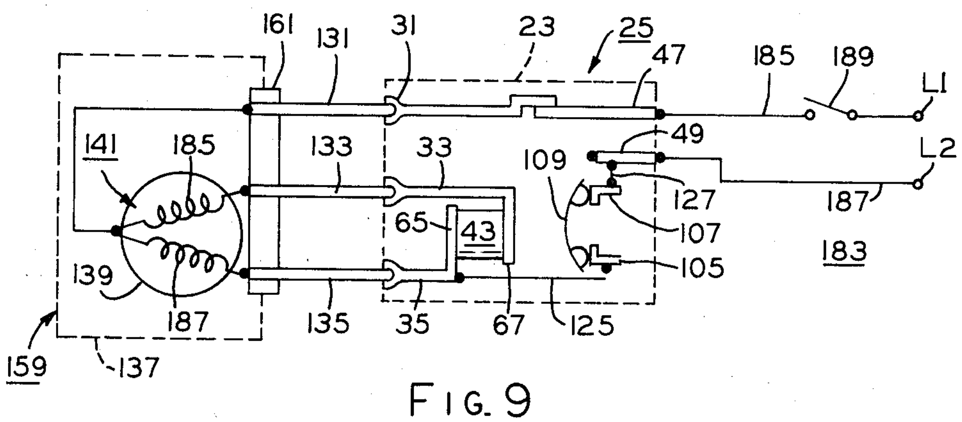
FIG. 9 is a schematic diagram of an exemplary circuit illustrating the electrical connections of a plurality of plug terminals of the apparatus in circuit relation with a winding circuit of a dynamoelectric machine arranged within a housing of the apparatus and also the electrical connections of the plug terminals with the components of the combination starter-protector device mounted thereto.

In the exemplary schematic diagram of a circuit 183 in FIG. 9, a start or auxiliary winding or winding means 185 and a run or main winding or winding means 187 of dynamoelectric machine winding circuit 141 are shown connected in circuit relation, and plug device 161 is illustrated in mounted association with housing or jacket 137 of apparatus 159; however, it is contemplated that the plug device may be mounted with a structural component of a dynamoelectric machine within the scope of the invention so as to meet the objects thereof. Plug terminals 133, 135 are respectively connected in circuit relation with start and run windings 185, 187 of dynamoelectric machine 139, and plug terminal 131 is connected in circuit relation with both the start and run windings. Female terminals 31, 33, 35 of combination starter-protector device 21 are disposed to releasably receive plug terminals 131, 133, 135 in electrical conductive plug-on relation when the combination starter-protector device is associated in circuit relation with dynamoelectric machine 139, and a pair of leads 185, 187 are respectively connected between a pair of power terminals L1, L2 and male terminals 47, 49 of combination starter-protector device 21, respectively. To complete the description of circuit 183, a dynamoelectric machine or motor control, such as an on-off switch 189 or the like for instance, may be interposed in lead 185.

In the operation of combination starter-protector device 21 when assembled onto plug 161, an operator may energize dynamoelectric machine 139 across line terminals L1, L2 by closing switch 189. In this manner, power is supplied from line terminal L1 through closed switch 189, lead 185 and male and female terminals 47, 31 of combination starter-protector device 21, to plug terminal 131 and therefrom to both start winding 185 and run winding 187 of dynamoelectric machine 139. From start winding 185, current flows through plug terminal 133, female terminal 33 of combination starter-protector device 21, contact plate 67, PTCR 43, contact plate 65, lead 125, terminal 105, and bimetal switch element 109 to terminal 107 and therefrom through lead 127, male terminal 49 and lead 187 to line terminal L2. At the same time, current also passes in parallel circuit relation from run winding 187 through plug terminal 135 to female terminal 35 of combination starter-protector device 21, and therefrom through lead 125 to line terminal L2 in the same manner as discussed above.

Figure 10:
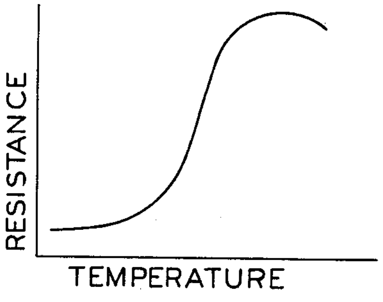
FIG. 10 is an exemplary graphical representation of the temperature and resistance characteristics of a positive temperature coefficient resistor (PTCR).

As graphically illustrated in FIG. 10, PTCR 43 is operable generally in response to current flow therethrough to increase its resistance generally as a function of its temperature; therefore, assuming the temperature of the PTCR to be rather low at the beginning of the start-up period of dynamoelectric machine 139 when switch 189 is closed, the PTCR will initially pass current at a value sufficiently great enough to effect a desired starting torque of the dynamoelectric machine during the start-up period thereof. As the temperature of PTCR 43 increases in response to the current flow therethrough to the anomaly or transition temperature of the PTCR, its resistance to such current flow also increases to a value which at least reduces the effectiveness of start winding 185 in winding circuit 141 of dynamoelectric machine 139. The point of time during the start-up period of dynamoelectric machine 139 at which the effectiveness of start winding 185 is reduced, as previously mentioned, may be predetermined so as to generally coincide with the desired running speed of dynamoelectric machine 139. Of course, PTCR 43 will not act to obviate current flow through start winding 185 during the start-up period of dynamoelectric machine 139, but the PTCR will throttle or restrict the passage of such current flow to such a minimal or small value that the start winding may be considered as being ineffective in winding circuit 141 of the dynamoelectric machine. Of course, when the operator opens switch 189, circuit 183 is interrupted across line terminals L1, L2, and dynamoelectric machine 139 is deenergized.

As well known in the art, overload conditions may deleteriously affect components of a dynamoelectric machine, such as for instance shorting or burning-out of the winding circuit in such dynamoelectric machine. These overload conditions may be effected by a plurality of different causes or by various combinations of such causes. For instances, some of the well known causes of motor overload conditions are: a running overload; a high temperature overload; an overload occasioned by a stalled or locked rotor; and a high current overload. Irrespective of the particular cause or combination of causes effecting an overload condition, a deleteriously high current is drawn by the dynamoelectric machine, and such high current is usually accompanied by or results in a high temperature. Therefore, for the sake of simplifying the discussion of overload conditions herein, it is to be understood that any cause for affecting such an overload condition will be discussed only within the context of a high current draw or current overload condition accompanied by a high temperature condition with respect to winding circuit 141 of dynamoelectric machine 139.

In the event of the occurrence of an overload or high current condition in dynamoelectric machine 139, a relatively large amount of current may be drawn in circuit 183 which could deleteriously affect start and run windings 185, 187, as discussed above. However, bimetal switch element 109 is responsive to the aforementioned high current and temperature increase to correspondingly increase the heat generated thereby and to effect characteristic snap-action of the bimetal switch element to a circuit interrupting position breaking its contacts 111, 113 from stationary contacts 115, 117 of protector terminals 105, 107. In this manner, circuit 183 is opened effecting deenergization of dynamoelectric machine 139 and isolating or electrically disassociating winding circuit 141 of the dynamoelectric machine from the current overload which may then exist across line terminals L1, L2.

Of course, the opening of circuit 183 in response to the snap-action movement of bimetal switch element 109, as discussed above, also effects the deenergization and the resultant cooling of PTCR 43. Even with the supplemental heat supplied or radiated from PTCR 43 through chamber 27 in casing 23 of combination starter-protector device 21 to dimetal switch element 109, the bimetal switch element may cool sufficiently in its circuit breaking or interrupting position so as to cycle several or a plurality of times between such circuit interrupting position and the circuit completing position thereof. Such cycling of bimetal switch element 109 may occur throughout or over a predetermined relatively short period of time, and such cycling is only effective to replace dynamoelectric machine 139 in circuit relation across line terminals L1, L2 for relatively very short periods of time. When bimetal switch element 109 is so cycled to its circuit completing position, PTCR 43 is, of course, reenergized to again supply heat to the bimetal switch element during the aforementioned relatively short period of time thereby to again at least assist the cyclical movement or thermal actuation of the bimetal switch element to its circuit interrupting position. Even though bimetal switch element 109 may cycle, as discussed above, for a brief period of time subsequent to the occurrence of the overload conditions in dynamoelectric machine 139, it is believed that the supplemental heat transferred mainly by radiation from PTCR 43 to bimetal switch element 109 is effective to increase the "off-time" thereof, i.e., when the bimetal switch element is in its circuit interrupting position, through the aforementioned predetermined relative short period of time. Thus, it may be noted that the predeterminately increased "off-time" of bimetal switch element 109 ocasioned by the supplemental heat supplied or transferred from PTCR 43 allows the PTCR to cool. As PTCR 43 cools, the resistance thereof is correspondingly reduced generally as a function of the decreasing temperature thereof. When the resistance and temperature of PTCR 43 are reduced to a sufficiently low value, the PTCR will again permit the passage therethrough of the current at a value sufficiently great enough to effect the restarting of dynamoelectric machine 139. Therefore, when bimetal switch element 109 also cools enough to cycle or return to its uninterrupted circuit completing position, current is drawn through PTCR 43 at values great enough to again effect the reenergization of winding circuit 141 in dynamoelectric machine 139 to bring it up to its predetermined running speed, as discussed hereinabove. When dynamoelectric machine 139 is so reenergized to attain its running speed, the self-heating effect of PTCR 43 once again raises its temperature and its resistance value as a function thereof to reduce the current flow therethrough to a value again reducing the effectiveness of start winding 185 in winding circuit 141 of dynamoelectric machine 139. Thus, the restarting of dynamoelectric machine 139 assumes that the cause of the overload condition has been alleviated or corrected, and if not so alleviated, combination starter-protector device 21 may again operate or function to open circuit 183 taking dynamoelectric machine 139 off the line across line terminals L1, L2, as previously described.

in view of the foregoing, it is now apparent that a novel combination starter-protector device 21 has been presented meeting the objects set out herein, as well as others, and it is contemplated that changes as to the precise arrangements, configurations, details and connections of the components of such combination starter-protector device may be made by those having ordinary skill in the art without departing from the spirit of the invention or the scope thereof as illustrated in the claims which follow.

What we claim as new and desire to secure by Letters Patent of the United States is:

1. A combination starter-protector device comprising:

a housing having a first sidewall generally interposed between a pair of opposite end walls with said first sidewall and said opposite end walls defining a chamber within said housing;

a plurality of clustered apertures through said first sidewall;

a plurality of seating hubs integrally formed with said first sidewall within said chamber and extending about said apertures, respectively;

a starter device arranged within said chamber and including a first casing having a first base wall interconnected with a second sidewall, said second sidewall of said first casing being disposed at least adjacent said first sidewall of said housing, a first recess in said first casing between said first base wall and said second sidewall, a PTCR disposed in said first recess and having a pair of opposite contact sides, a pair of contact plates arranged in electrical contacting engagement with said opposite contact sides of said PTCR, one of said contact plates being disposed within said first recess at least adjacent said first base wall, a first tab extending from said one contact plate through at least one of said first base wall and said second sidewall exteriorly of said first casing, the other of said contact plates being arranged generally exteriorly of said first casing so as to enclose said first recess with the PTCR therein isolated from said chamber, a second tab extending from said other contact plate, and a plurality of means extending from said other contact plate exteriorly of said first casing across said second sidewall into securing engagement with said first base wall for maintaining said other contact plate against displacement from said first casing:

a pair of female terminal means seated in a pair of said seating hubs generally in alignment with a pair said apertures and connected with said first and second tabs exteriorly of the first casing for supporting said starter device within said chamber, respectively;

an overload protector device arranged within said chamber and including a second casing disposed between said one opposite end wall of said housing and said other contact plate of said starter device and having a second base wall interconnected with a third sidewall, said third sidewall of said second casing being disposed at least adjacent said first sidewall of said housing, a second recess in said second casing between said second base wall and said third sidewall thereof, at least a pair of terminals extending through said second base wall and arranged at least adjacent said one opposite end wall of said housing, respectively, and switch means including a bimetal element mounted within said second recess in thermal coupling relation between said PTCR for making with said terminals and for breaking therebetween.

a first lead within said chamber connected in circuit relation between one of said terminals of said overload protector device exteriorly of said second casing and one of said female terminal means;

an access opening in said first sidewall of said housing and at least adjacent the other of said opposite end walls thereof;

a pair of male terminals arranged in preselected positions in said access opening and each of said male terminals including an electrical connector section accessible from exteriorly of the housing and a support section within said chamber;

a third female terminal means seated in a third one of said seating hubs generally in alignment with a third one of said apertures for connection in circuit relation with said support section of one of said male terminals;

means secured to said housing within said chamber for mounting said support section of the other of said male terminals and arranged within said chamber for displacement preventing positioning engagement with said support section of said one male terminal so as to maintain said male terminals generally in the preselected positions thereof and said third one female terminal against displacement from said third one seating hub; and a second lead within said chamber connected in circuit relation between said other support section on said other male terminal and the other of said terminals of said overload protector device exteriorly of said second casing thereof.

2. A combination starter-protector device comprising:

a housing having a chamber therein:

a PTCR in said chamber;

a bimetal switch means in said chamber and adapted for thermal coupling relation with said PTCR;

an opening in said housing and intersecting with said chamber;

a pair of male terminals arranged in preselected positions in said opening and each including an electrical connector section accessible from exteriorly of said housing and a support section within said chamber; and means releasably secured to said housing within said chamber so as to close said opening and adapted for mounting said support section of one of said male terminals and for displacement preventing engagement with said support section of the other of said male terminals so as to maintain said male terminals generally in the preselected positions thereof.

3. A combination starter-protector device as set forth in claim 2 further comprising an aperture in said housing and intersecting with said chamber, and a female terminal disposed in said aperture and connected with said support section of said other male terminal wherein at least the engagement between said support section of said other male terminal and said mounting and displacement preventing engagement means maintains said female terminal against displacement from said aperture.

4. A combination starter-protector device as set forth in claim 2 wherein said housing includes a pair of separable housing members defining said chamber and said opening, said mounting and displacement preventing means being secured to one of said separable members and extending at least in part across said opening.

5. A combination starter-protector device as set forth in claim 4 further comprising resilient means releasably associated with said housing members for retaining them against separation.

6. A combination starter-protector device adapted for removable mounting in a preselected assembly position onto at least a pair of plug terminals associated with a housing having a dynamoelectric machine arranged therein and with the plug terminal pair connected in circuit relation with a winding circuit of the dynamoelectric machine, the combination starter-protector device comprising:

a casing including a pair of separable casing members;

a chamber within said casing members;

a PTCR and a bimetal switch means disposed in said chamber and arranged in thermal coupling relation;

a pair of female terminal means in said casing connected in circuit relation with said PTCR and said bimetal switch means and adapted for receiving in electrical engagement the plug terminal pair, respectively, when the combination starter-protector device is removably mounted in the preselected assembly position thereof; and resilient means releasably secured with said casing members for retaining them against separation and including means for releasable securing engagement with a part of the housing generally adjacent the plug terminal pair so as to releasably maintain the combination starter-protector device against displacement from its preselected assembly position.

7. A combination starter-protector device as set forth in claim 6 wherein said resilient means comprises a spring extending about at least a major peripheral portion of said casing members.

8. A combination starter-protector device as set forth in claim 7 wherein said spring includes a pair of opposite ends respectively releasably secured in gripping engagement with one of said casing members.

9. A combination starter-protective device as set forth in claim 7 wherein said releasable securing engagement means comprises a spring arm secured to said spring and having a free end defining detent means adapted for the releasable securing engagement with the housing part.

10. A combination starter-protector device as set forth in claim 6 wherein said releasable securing engagement means comprises a spring arm connected with said resilient means and having a free end portion defining detent means adapted for releasable attachment with the housing part.

11. A combination starter-protector device adapted for removable mounting in an assembly position onto a clustered plurality of plug terminals associated with a housing having a dynamoelectric machine arranged therein and with the plug terminals connected in circuit relation with a winding circuit of the dynamoelectric machine, the combination starter-protector device comprising:

a pair of separable casing members having a chamber therein;

a clustered plurality of apertures in one of said casing members;

a plurality of female terminals disposed in said apertures and each having a support section within said chamber, said female terminals being adapted to receive at least some of said plug terminals in electrical contacting engagement when the combination starter-protector device is releasably mounted thereon in its asembly position;

a starter device within said chamber including a PTCR, a pair of means for electrical contacting engagement with said PTCR, respectively, means for encasing therewithin said PTCR and at least one of said electrical contacting engagement means, and a pair of tab means extending from said electrical contacting engagement means exteriorly of said encasing means for connection with said support sections of two of said female terminals within said chamber, respectively;

a bimetal switch means in said chamber adapted for thermal coupling relation with said PTCR and with one side of said bimetal switch means connected in circuit relation with one of said at least one electrical contacting engagement means and the other of said electrical contacting engagement means;

a pair of male terminals arranged with at least one of said one casing member and the other of said casing members and each male terminal having an electrical connector section exteriorly of said casing members and a support section within said chamber, said support section of one of said male terminals being connected with said support section of a third one of said female terminals and said support section of the other of said male terminals being connected in circuit relation with the other side of said bimetal switch means; and resilient means releasably secured with said casing members for retaining them against separation and including means for releasable attachment in engagement with the housing so as to releasably maintain the combination starter-protector device against displacement from its assembly position.

* * * * *